United States Patent
Li et al.

(10) Patent No.: US 8,432,908 B2
(45) Date of Patent: Apr. 30, 2013

(54) EFFICIENT PACKET REPLICATION

(75) Inventors: Dominic Li, Stow, MA (US); Nick Horgan, Waltham, MA (US); Kathryn Russell, Westford, MA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/058,103

(22) Filed: Mar. 28, 2008

(65) Prior Publication Data
US 2009/0196288 A1    Aug. 6, 2009

Related U.S. Application Data

(60) Provisional application No. 61/026,586, filed on Feb. 6, 2008.

(51) Int. Cl.
*H04L 12/56* (2006.01)
*H04L 12/28* (2006.01)

(52) U.S. Cl.
USPC .......................................... 370/390; 370/412

(58) Field of Classification Search ............. 370/390, 370/412
See application file for complete search history.

(56) References Cited

U.S. PATENT DOCUMENTS

| | | | |
|---|---|---|---|
| 6,219,772 B1 * | 4/2001 | Gadangi et al. ............... | 711/170 |
| 7,206,310 B1 * | 4/2007 | Chen et al. .................... | 370/389 |
| 2002/0156908 A1 * | 10/2002 | Basso et al. ................... | 709/231 |
| 2004/0008716 A1 * | 1/2004 | Stiliadis ........................ | 370/429 |
| 2004/0230696 A1 * | 11/2004 | Barach et al. ................. | 709/238 |
| 2006/0253682 A1 * | 11/2006 | Armstrong et al. ........... | 711/173 |
| 2006/0268913 A1 * | 11/2006 | Singh et al. ................... | 370/412 |
| 2011/0064084 A1 * | 3/2011 | Tatar et al. .................... | 370/412 |

* cited by examiner

*Primary Examiner* — Mark Rinehart
*Assistant Examiner* — Angel Brockman
(74) *Attorney, Agent, or Firm* — Sterne, Kessler, Goldstein & Fox PLLC

(57) ABSTRACT

Methods, systems, and computer program products are provided for efficient packet replication. In an embodiment, a packet is stored as a linked list of at least one page. Replicating the packet comprises creating a new header page and linking it to the first page of the linked list. Each replica packet may be transmitted independently and concurrently. In an embodiment where packets are stored in queues, each replica packet may be dequeued for transmission independently and concurrently. After all references to a page have been transmitted (or dequeued), the page may be freed.

21 Claims, 14 Drawing Sheets

EFFICIENT PACKET REPLICATION

CROSS REFERENCE TO RELATED APPLICATIONS

This application claims benefit of U.S. Provisional Application No. 61/026,586, entitled "Efficient Packet Replication," filed Feb. 6, 2008, which is incorporated by reference herein in its entirety.

BACKGROUND OF THE INVENTION

1. Field of the Invention

Embodiments of the present invention relate to data communication. More specifically, certain embodiments of the invention relate to methods, systems, and computer program products for replicating packets of data, and replicating packets of data for multiple output streams.

2. Background Art

Packet forwarding is relaying packets from one node to another in a computer network. The conceptually simplest type of packet forwarding is unicasting: a one-to-one communication—relaying a packet from one location to the next. Some other common types of packet forwarding are one-to-many: for example, broadcasting and multicasting. Broadcasting is forwarding a packet to all of the devices on the network. Multicasting is forwarding the packet to a select group of devices. Some implementations of packet forwarding devices may make multiple copies of the original packet to implement these one-to-many forwarding capabilities. Such implementations may require an excessive amount of memory.

This is especially true in modern high capacity networks, where each network device (such as a packet forwarding device) will handle millions of packets per second. Also, communications devices may have multiple output ports. For performance reasons, replicas of the same packet should be independently and concurrently transmitted via these multiple output ports.

Thus, what is needed is a method to replicate packets to one or more output ports for transmission without consuming undue amounts of processing or memory.

BRIEF SUMMARY OF THE INVENTION

Methods, systems, and computer program products are provided for efficient packet replication. In an embodiment, a packet is stored as a linked list of at least one page. Replicating the packet comprises creating a new header page and linking it to the first page of the linked list. Each replica packet may be transmitted independently and concurrently. In an embodiment where packets are stored in queues, each replica packet may be dequeued for transmission independently and concurrently. After all references to a page have been transmitted (or dequeued), the page may be freed.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
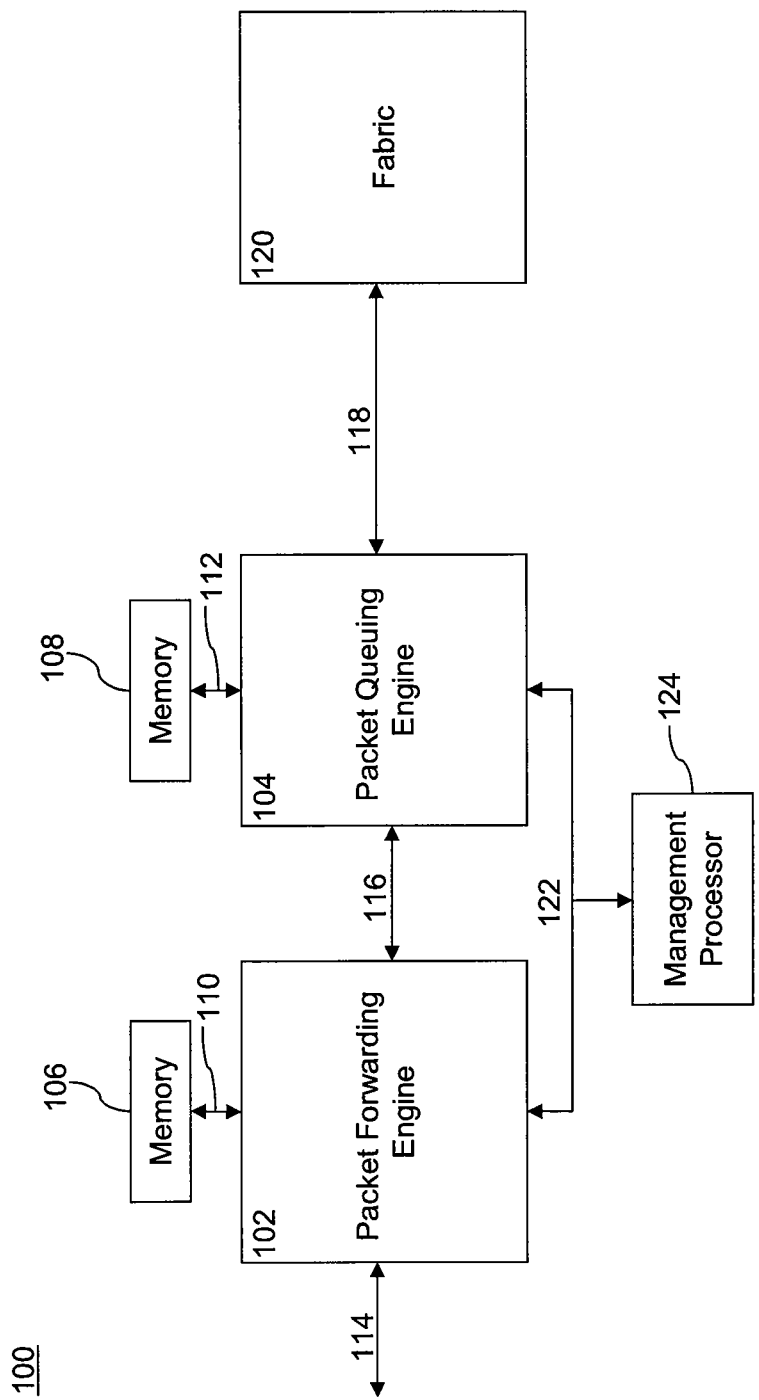
FIG. 1 illustrates an exemplary environment 100 in which embodiments of the invention might operate.

The present invention will now be described with reference to the accompanying drawings. In the drawings, like reference numbers may indicate identical or similar elements. Additionally, the left-most digit(s) of a reference number may identify the drawing in which the reference number first appears.

DETAILED DESCRIPTION OF THE INVENTION

Overview

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be used in a variety of other applications. The scope of the invention is not limited to the disclosed embodiments. The invention is defined by the claims appended hereto.

References to "one embodiment," "an embodiment," "this embodiment," "an example embodiment," etc., indicate that the embodiment described may include a particular feature, structure, or characteristic, but every embodiment might not necessarily include the particular feature, structure or characteristic. Moreover, such phrases are not necessarily referring to the same embodiment. Further, when a particular feature, structure, or characteristic is described in connection with an embodiment, it is understood that it is within the knowledge of one skilled in the art to effect such a feature, structure, or characteristic in connection with other embodiments whether or not explicitly described.

Although embodiments are applicable to any communication system or any system which replicates packets, for brevity and clarity a packet forwarding device is used as an example to illustrate various features of the present invention.

Example Environment

FIG. 1 illustrates an exemplary environment 100 demonstrating a configuration in which a packet forwarding engine 102 might operate. Embodiments of the invention may be implemented in packet forwarding engine 102. A person of ordinary skill in the art would realize that embodiments of the invention are also applicable to any other environments and configurations in which packets are replicated or replicated and forwarded, and are not limited to this environment nor a packet forwarding engine 102.

In addition to packet forwarding engine 102, exemplary environment 100 includes a packet queuing engine 104, a management processor 124, and a fabric 120. Packet forwarding engine 102 forwards packets to and from fabric 120 via interfaces 114 and 116 and packet queuing engine 104. Packet queuing engine 104 provides traffic management and interfaces packet forwarding engine 102 to fabric 120 via interface 118. Management processor 124 manages the interactions between packet forwarding engine 102 and packet queuing engine 104 through interface 122. Packet forwarding engine 102 and packet queuing engine 104 may have internal and/or external storage devices 106 and 108 respectively (external only shown in figure for brevity). Storage devices 106 and 108 may be any storage technology including but not limited to various types of volatile random access memory (e.g., SRAM, DRAM, SDRAM, etc.), and storage device interfaces 110 and 112 may be of any type.

All interfaces (e.g., 114, 116, 118, 110, and 122) are shown as a single line for simplicity and may be any number of distinct interfaces of any width, potentially different types, protocols, sizes, and/or standards—e.g., any combination and multiples of ten Gigabit Ethernet attachment unit interfaces (XAUI), ten Gigabit Media-Independent Interfaces (XGMII), Serial Gigabit Media Independent Interfaces (SGMII), Peripheral Component Interconnects (PCI), System Packet Interfaces (e.g., SPI 4.2), proprietary protocols (e.g., HiGig), and/or any other interface standards, protocols.

Figure 2:
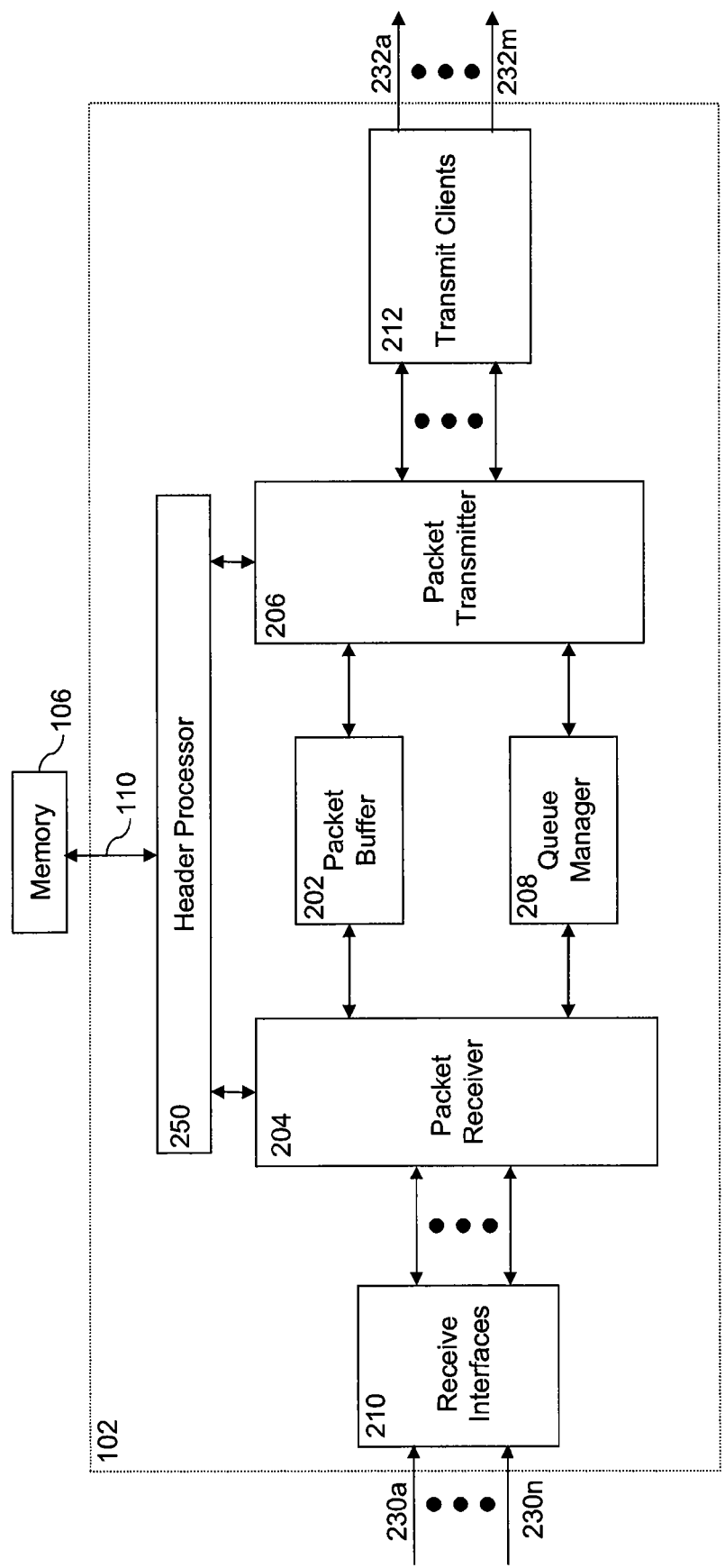
FIG. 2 illustrates an exemplary packet forwarding engine in which embodiments of the present invention may be implemented.

FIG. 2 illustrates an exemplary packet forwarding engine 102, which may have a storage device 106 and storage device interface 110 as described above. Packet forwarding engine 102 includes a packet receiver 204, a packet transmitter 206, a packet buffer 202, a queue manager 208, one or more receive interfaces 210, one or more transmit clients 212, and a header processor 250. Packets are received through one or more interfaces 230a-230n and handled by receive interface modules 210, and then transferred to packet receiver 204. Packet receiver 204 stores received packets in packet buffer 202. Packet headers are processed by header processor 250. Packet transmitter 206 transmits packets through one or more transmit interfaces 232a-232m. In an embodiment, transmission is via one or more transmit clients 212.

Queue manager 208 manages queues holding packets in packet buffer 202: packet receiver 204 requests a page of memory from queue manager 208, and queue manager 208 returns an address to a page of memory in packet buffer 202. If a packet size exceeds one page, packet receiver 204 requests another page, and queue manager 208 provides the page address and links the pages of the packet. Queue manager 208 may also put the packets (each including one or more linked pages) into queues.

Similarly, when packets are to be transmitted, packet transmitter 206 requests the next packet, page by page, from queue manager 208. Queue manager 208 tells packet transmitter 206 where to begin reading each page from memory in packet buffer 202.

Packet Queues

Figure 3:
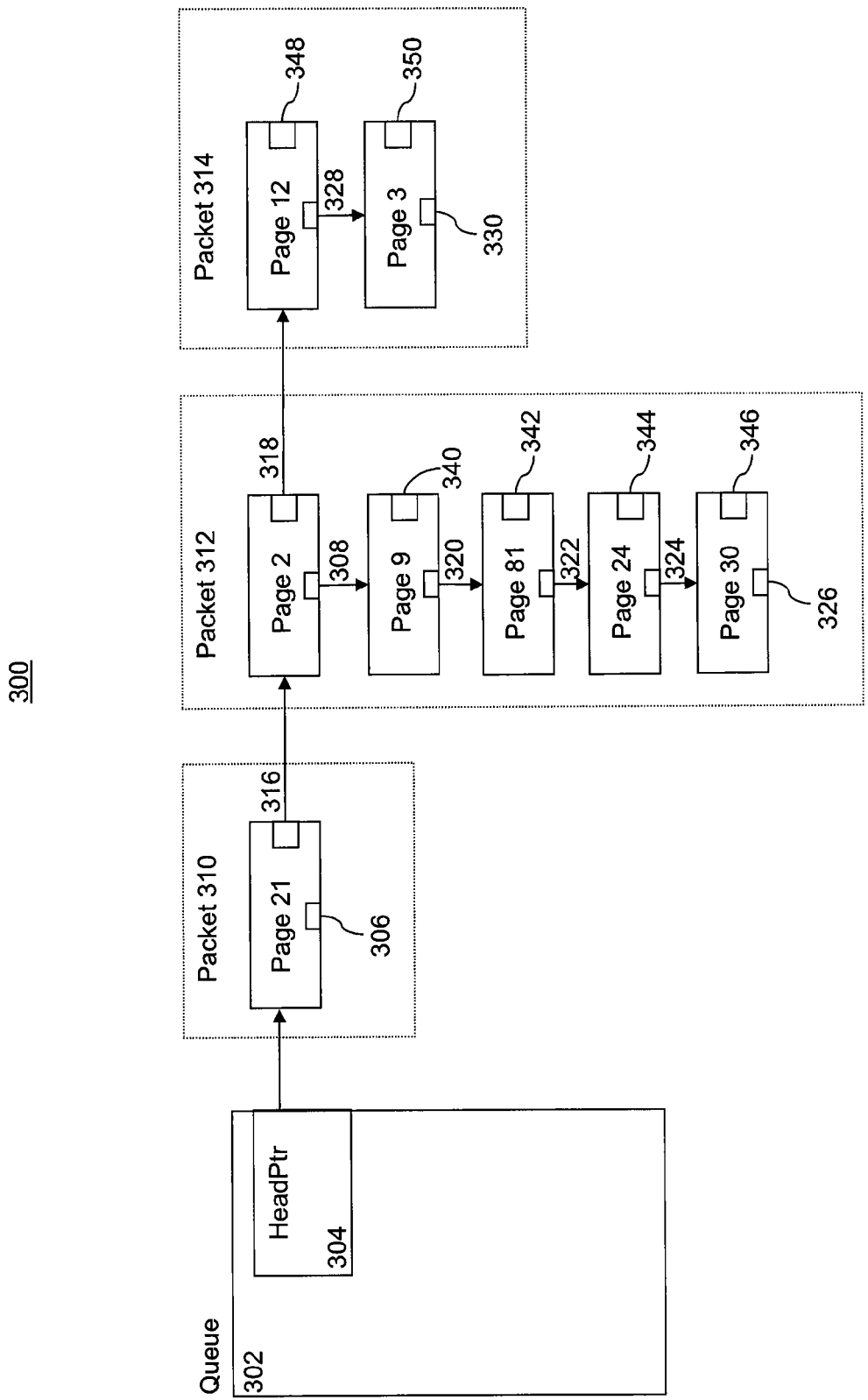
FIG. 3 illustrates an example queued linked list of pages which may be used by embodiments of the invention.

FIG. 3 illustrates an example embodiment wherein a packet is stored as a linked lists of pages of memory, and a queue may hold zero, one, or more packets at any time. A page represents a section of storage in a storage device. In an embodiment, a page is a section of random access memory. In a further embodiment, a page is a section of memory in a packet buffer (e.g., packet buffer 202). Pages may be of a consistent size in order to facilitate memory management during packet forwarding.

As shown, a queue 302 is currently holding three packets 310, 312, and 314. Head pointer 304 points to the head of the queue, which is the first page of packet 310, page 21. Packet 310 is completely stored in a Page 21. In this exemplary embodiment, the numbering of the pages represents the numbering of the pages of memory in a packet buffer.

Page 21 includes a next page pointer 306 and a next packet pointer 316. Because Packet 310 includes only one page, next page pointer 306 does not point to another page. In an embodiment, next page pointer 306 is null. In another embodiment, next page pointer 306 is set to a value indicating end of packet. Next packet pointer 316 points to a first page of a packet 312, page 2.

Packet 312 includes pages 2, 9, 81, 24, and 30, which include next packet pointers 318, 340, 342, 344, and 346, respectively, and next page pointers 308, 320, 322, 324, and 326, respectively. Next page pointers point to the next page in the packet, thus next page pointer 308 points to page 9, next page pointer 320 points to page 81, etc., until the last page, page 30. Page 30's next page pointer 326, similarly to next page pointer 306, does not point to another page. Page 2's next packet pointer 318 points to the first page of packet 314, page 12. In an embodiment, the remaining next packet pointers do not point to a next packet. In an embodiment next packet pointers 340, 342, 344, and 346 are null. In another embodiment, the state of next packet pointers 340, 342, 344, and 346 is not set to any particular value.

Packet 314 includes two pages, page 12 and page 3. Next page pointer 328 of page 12 points to page 3. Next page pointer 330 of page 3 does not point to another page. Next packet pointer 348 does not point to another packet because this is the last packet in queue 302. In an embodiment, next packet pointer is null. In another embodiment, next packet pointer 348 is set to a value indicating that it is the end packet.

Using this or a similar structure, a packet may be enqueued and dequeued a page or a packet at a time, and the queue of packets may be traversed packet by packet or page by page.

Header Processing

In an embodiment, a header processor (e.g., header processor 250 as illustrated in FIG. 2) may process packet headers. In an embodiment, packets received at a packet receiver may be queued for processing by the header processor. The header processor adds a new header to the front of each packet.

Figure 4C:
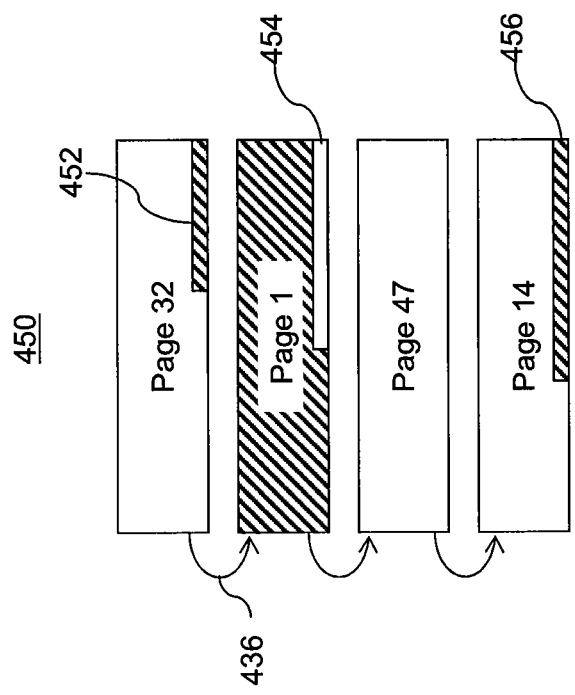
FIG. 4 illustrates example packets stored as linked lists used to demonstrate embodiments of the invention.
Figure 4B:
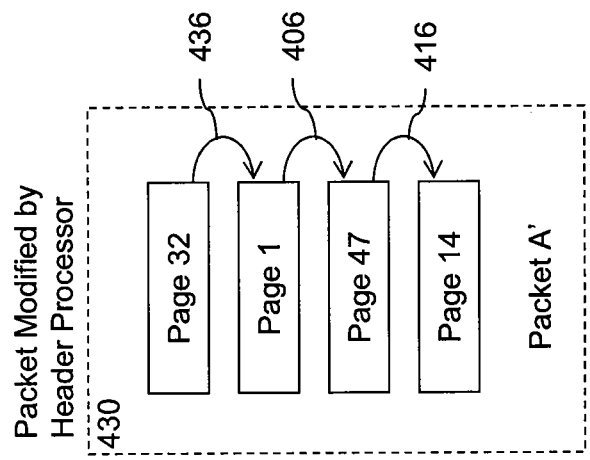
Figure 4A:
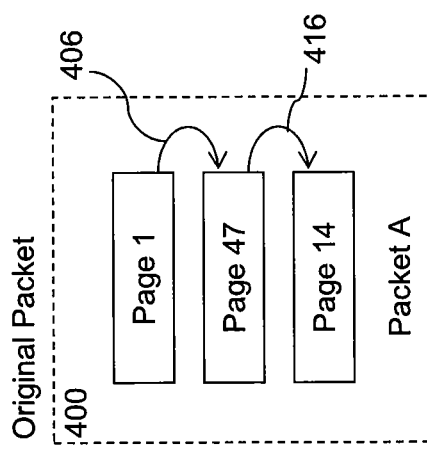

FIGS. 4A-4C illustrate an example embodiment by showing the changes to an example packet and pages. FIG. 4A shows an example packet 400, which is stored in pages 1, 47, and 14. In an embodiment, packet 400 may be queued with other packets awaiting processing by the header processor. Page 1 includes a next page pointer 406, which points to the next page, page 47. Page 47 includes a next page pointer 416, which points to page 14.

FIG. 4B illustrates an example packet 430, which is the resulting data structure after the header processor processes packet 400. Packet 430 includes new header page 32, which has been pre-pended to the front of packet 400 to form packet 430. Next page pointer 436 of page 32 points to page 1.

FIG. 4C illustrates an example packet 450, showing an embodiment wherein some data from a first page of an original packet (e.g., page 1) is duplicated in a first page of a header processor-modified packet (e.g., page 32). Packet 450 is similar to packet 430 of FIG. 4B. However, new header page 32 includes some data which was duplicated by a header processor from page 1. Thus, in an embodiment, new header page 32 may include a pointer offset to allow skipping the duplicated or otherwise superfluous data. Thus next page pointer 436 points to the next page (the original first page), page 1. Adding a pointer offset to that address points to non-superfluous data 454 in page 1.

In an embodiment, pages are a consistent size of storage, e.g., each page is a certain number of bytes of memory. In a further embodiment, the header processor pre-pends a new first page as described above, but uses a lesser amount of storage than a standard page size. That is, the header processor does not completely fill up a page with data and processed header bytes. Thus, a first page after processing, such as page 32, may have an unused section 452 for that packet.

In another embodiment, a packet size may not be evenly divisible by the page size. Thus, a last page of a packet (e.g., packet 14 of page 450) may have an unused section 456.

Packet Replication

Replicas of a packet may be efficiently created, manipulated, and stored by making more than one new header page, and linking the new header pages to the original packet's pages.

Figure 5:
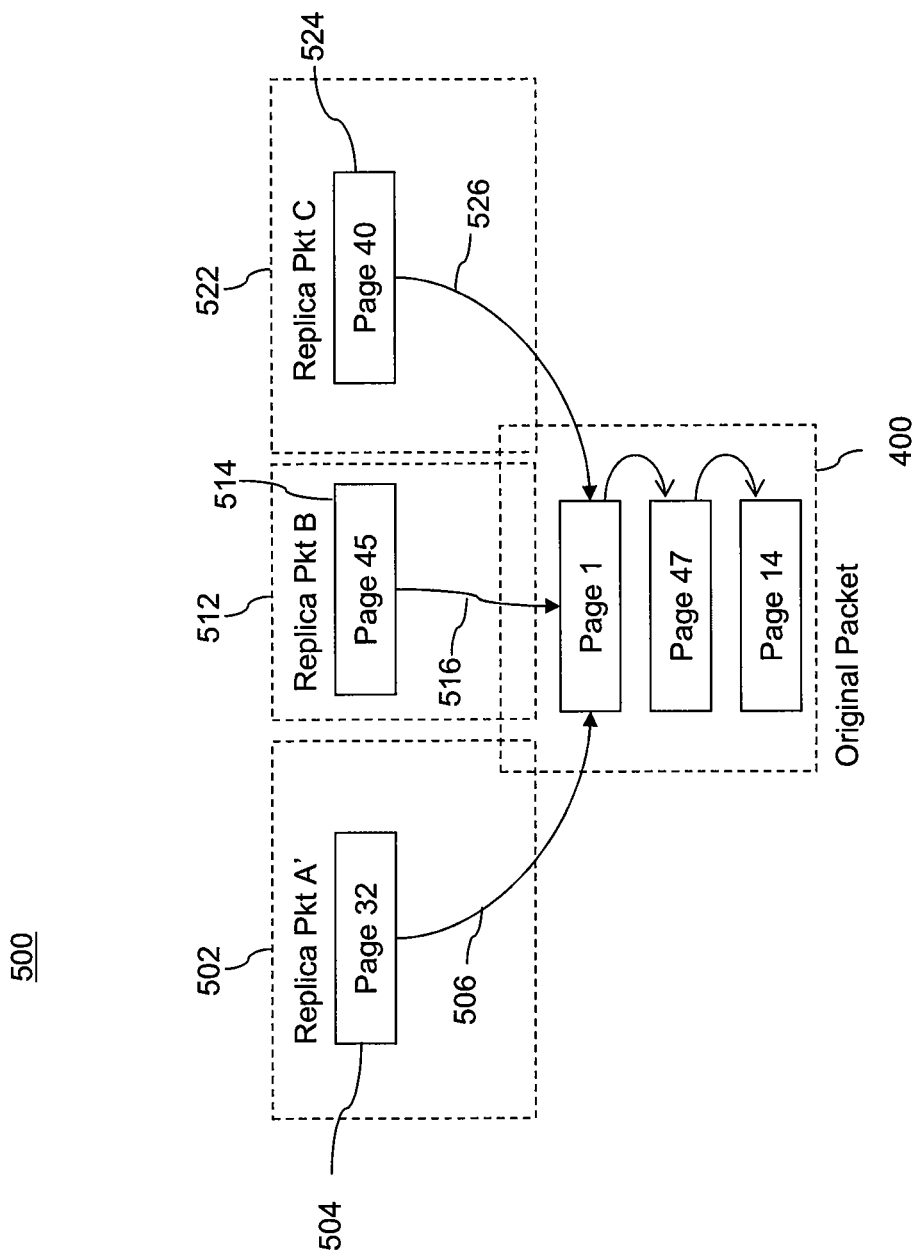
FIG. 5 illustrates example replica packets stored as linked lists used to demonstrate embodiments of the invention.

FIG. 5 illustrates an exemplary embodiment wherein original packet 400 has been replicated into three replica packets 502, 512, and 522. Replica packets 502, 512, and 522 include new header pages 32, 45, and 40 respectively. New header pages 32, 45, and 40 include next page pointers 506, 516, and 526 respectively, all of which point to the first page of original packet 400, page 1. Page 1 is linked to the rest of the pages holding packet 400's data: page 47 and page 14 in this example.

Thus, multiple replicas of a packet are created through the generation of multiple new header pages linked to the pages of the original packet. In an embodiment, the header processor decides the number of replica packets to create. In a further embodiment, multiple copies of the same original first page or header page (e.g., page 1) are sent to the header processor, which makes multiple new header pages. In yet another embodiment, each new header pages contain an indication of the total number of replica packets and/or and identification of the current header (e.g., there are 400 replicas and/or this is the number 182 replica).

In an embodiment, packet replication proceeds as follows: A device receives an original packet from one of one or more clients and sends a copy of the packet header to a header processor. The header processor may be external or internal to the device. The header processor decides how many times to replicate the packet. Along with this information, the modified (output) packet header and some state information are passed back to the device (or to another portion of the device). The output new header page is queued to a destination queue. The original packet, plus replication information, is placed on the corresponding queue back to the header processor. Replication information includes the number of copies to be made as well as state information generated by the Header Processor. When this original packet gets to the top of the queue again, the original (input) packet header along with the state information is copied the appropriate number of times back into the header processor. A copy number is sent along with each packet header. The replicated packet headers return from the header processor. A new page is allocated to store each modified packet header. The new packet header pages are linked to the first page of the original packet. Since each replica packet is associated with a unique copy number, each replica packet may be processed and modified differently by the header processor.

In an embodiment, replica packets 502, 512, and 522 are transmitted by one or more output ports. This transmission may occur concurrently. In an embodiment, a packet transmitter sends a dequeue request for a page or a packet to a queue manager. The packet transmitter tracks (or looks up) which queue corresponds to which port, and selects (or is told, for example, by an arbiter) which port should be serviced next (i.e., which queue should be dequeued next). This determination may be based on client requests to the ports.

If a packet is being dequeued, the queue manager reads the information for the packet (i.e., the linked list of pages) to be dequeued and tells the packet transmitter where the header page is stored. If a page is being dequeued, the queue manager tells the packet transmitter where the packet is stored.

After the dequeue is complete, the packet transmitter informs the queue manager that the dequeue is done. The queue manager may free pages of memory when appropriate. When no more packets (e.g., replicas) use a page, the page's memory may be freed. In an embodiment, a reference count tracks the status of each page (e.g., the dequeue state). The reference count for each page corresponds to the number of replicas initially referencing the original packet (i.e., each page of the original linked list), decremented each time that page of a replica is transmitted. This process is described in detail elsewhere herein.

Example Methods

FIG. 6 shows flowchart 600 illustrating an example embodiment of packet replication and transmission. The steps may be performed in any order or concurrently unless specified otherwise. Some embodiments of the present invention do not require the performance of each and every step.

In step 602, a packet is received as described elsewhere herein.

In step 604, the packet is stored as a linked list as described elsewhere herein.

In decision step 606, a determination is made whether the packet requires replication. If the packet requires replication, proceed to step 650. If not, proceed to step 608.

In step 650, the original packet is replicated as described elsewhere herein. In an embodiment, the packet which was initially processed by the header processor prior to packet replication will also be transmitted. If this is the case, proceed to step 608 in addition to step 670. In an embodiment, step 650 is performed as illustrated by flowchart 650 shown in FIG. 6B.

In step 670, the replica packets are transmitted. In an embodiment, step 670 is performed as illustrated by flowchart 670 shown in FIG. 6C.

In step 608, the packet which was initially processed by the header processor prior to packet replication is transmitted as described elsewhere herein.

Figure 6B:
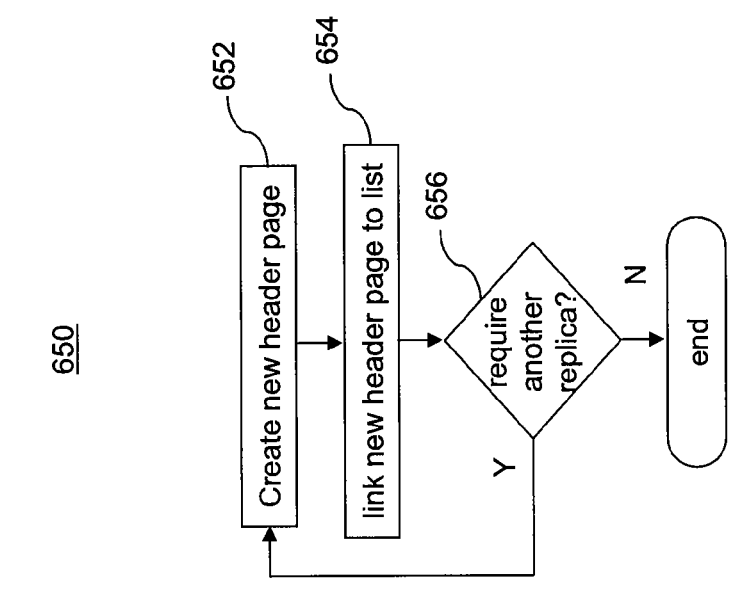
FIGS. 6A-6D shows flowcharts 600, 650, 670 and 680 illustrating exemplary methods of packet replication and transmission according to embodiments of the invention.
Figure 6A:
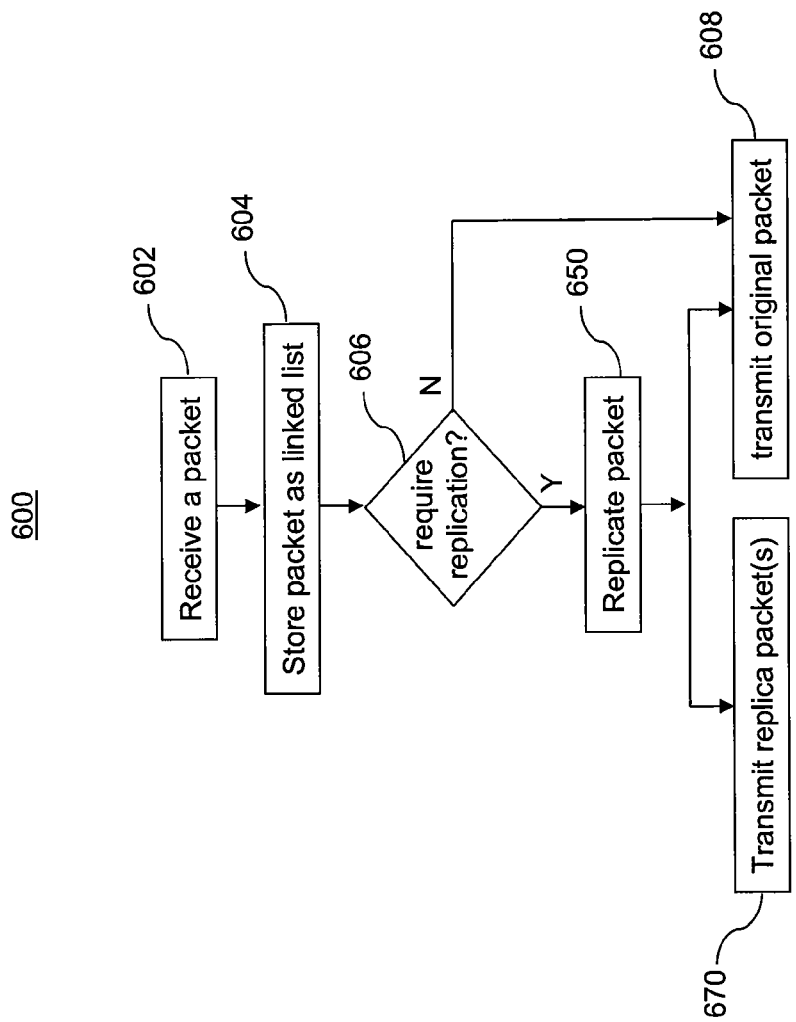

FIG. 6B shows flowchart 650 illustrating an example embodiment of step 650 of flowchart 600, the replication of a packet. The steps may be performed in any order or concurrently unless specified otherwise. Some embodiments of the present invention do not require the performance of each and every step.

In step 652, a new header page for a replica packet is created

In step 654, the new header page is linked to the original linked list (i.e. received packet).

In decision step 656, it is determined whether another replica is required. If so, proceed to step 652. If not, end.

Figures 6C, 6D:
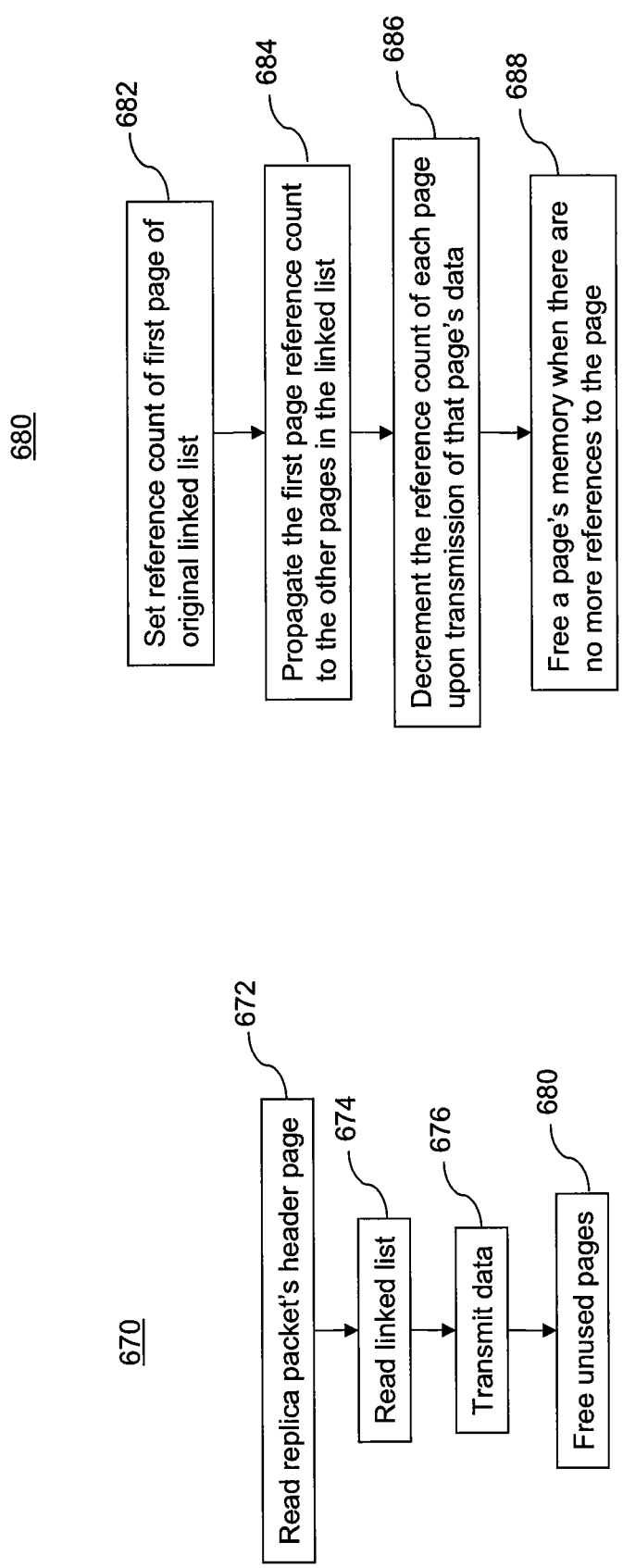

FIG. 6C shows flowchart 670 illustrating an example embodiment of step 670 of flowchart 600, transmission of a replica packet. The steps may be performed in any order or concurrently unless specified otherwise. Some embodiments of the present invention do not require the performance of In step 672, the replica packet's header page is read. In an embodiment, the header page is dequeued from a queue. In another embodiment, the entire packet is dequeued.

In step 674, the remaining pages of the linked list are read. In an embodiment, each page is dequeued from a queue. In another embodiment, the remaining pages are simply read as the entire packet was dequeued in step 672.

In step 676, the packet is re-assembled, and the appropriate data from each page is transmitted in turn.

In step 680, any pages that are no longer needed by other packets are freed. This step may be performed concurrently to the other steps in this flowchart. In an embodiment, this step is performed as illustrated in flowchart 680 in FIG. 6D, freeing unused pages.

FIG. 6D shows flowchart 680 illustrating an example embodiment of step 680 of flowchart 670. The steps may be performed in any order or concurrently unless specified otherwise. Some embodiments of the present invention do not require the performance of each and every step.

In step 682, the reference count of the first page of the original linked list is set according to the total number of references to that page (e.g., according to the number of replicas created).

In step 684, the first page reference count is propagated to the remaining pages in the linked list. This propagation may occur in any manner. In an embodiment, this propagation occurs independent of other actions. In another embodiment, this step occurs as the first replica traverses the pages in the process of dequeuing and transmitting as described elsewhere herein.

In step 686, the reference count of each page is decremented upon dequeue or transmission of that page's data (i.e., as that page's data for each replica is dequeued or transmitted). In an embodiment, the propagation of step 684 occurs as the first replica packet is dequeued or transmitted. Because dequeuing or transmission of replicas may occur independently, the reference count for a page may be decremented before the reference count has been propagated to that page. For this reason, it is acceptable that the reference count of a page may have a negative value.

In step 688, a page's memory is freed when this is the last reference to the page. In an embodiment, a reference count of a page is used to determine when a page may be freed. For example, this condition may occur when the reference count has a value of 1 when the page is dequeued or transmitted.

The method described above is further elaborated in the following text and FIGS. 7A-7F, illustrating the state of the pages of an example linked list according to embodiments of the invention. For this example, a dequeue is the event which is tracked, and the transmission of a page is assumed to happen after dequeue but is not discussed. It is important to remember that the replica packets may be concurrently dequeued independently of each other. For example, the dequeue order may be determined by the order in which various external applications demand data. Thus, to illustrate the process in this example, the three packets' pages are dequeued in the following order: first part of packet 512 is dequeued, followed by part of packet 502, the rest of packet 502, all of packet 522, and finally by the rest of packet 502. In this example, the reference counts of pages will be initially set to zero, but the pages will be freed when the reference count is 1 prior to decrementing. In another example embodiment, the page is not freed when the reference count is 0 after decrementing.

Figure 7A:
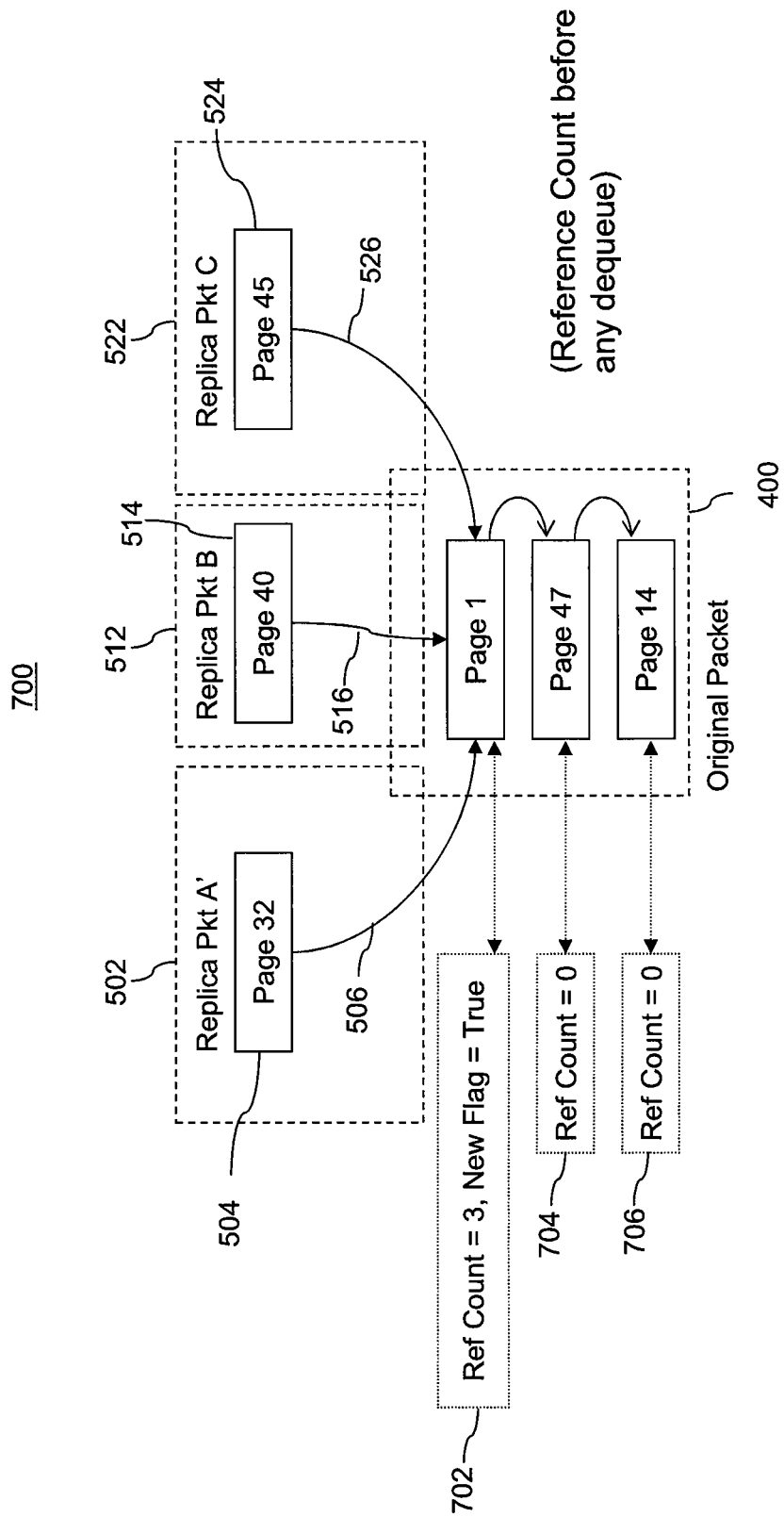
FIGS. 7A-7F, illustrate the states of pages in an example linked list according to embodiments of the invention.

FIG. 7A illustrates the state of three example replica packets (or one original and two replicas) 502, 512, and 522 before any pages have been dequeued (or transmitted). Replica packets 502, 512, and 522 include new header pages 32, 40, and 45 respectively. New header pages 32, 45, and 40 include next page pointers 506, 516, and 526 respectively, all of which point to the first page of original packet 400, page 1. Page 1 is linked to the rest of the pages holding packet 400's data, page 47 and page 14.

Because original packet 400 has not been dequeued, a state 702 of page 1 includes a reference count=3, and a "New" flag set to true. Pages 47 and 14 reference counts 704 and 706 are initially set to 0. Any one of the replica packets, 502, 512, or 513 can become the first packet to dequeue page 1. When this occurs, that packet is responsible to propagate the reference count; the "New" flag is also cleared to prevent other replica packets to propagate the reference count. This is further illustrated in the example below.

Figure 7B:
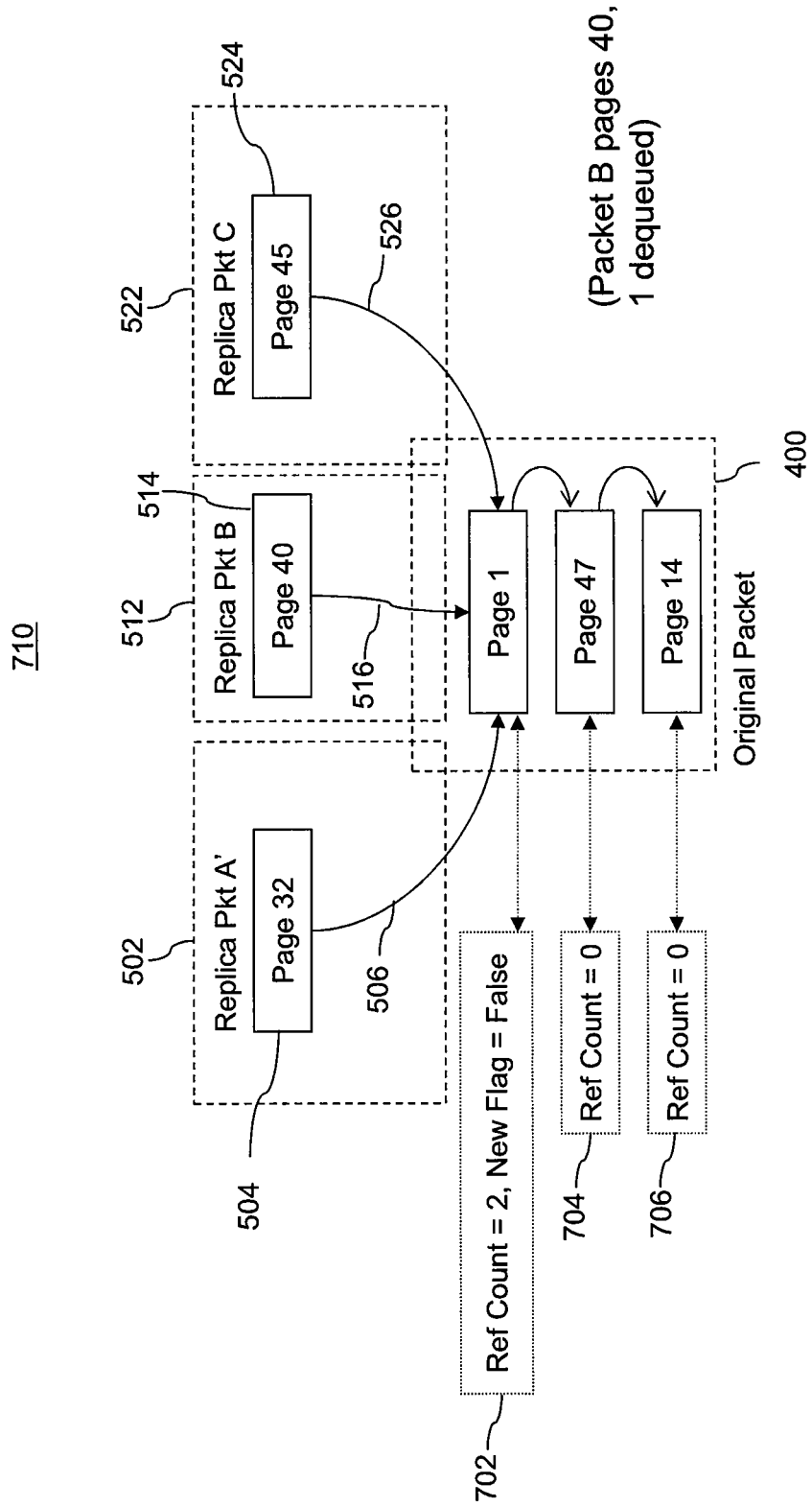

First, page 40 and page 1 of replica packet 512 are dequeued. These and the following pages may have been dequeued in this order for any reason, for example, the client slated to receive packet 512 requested data first. Because state 702 of page 1 initially includes New flag=true, the reference count (i.e., "3") is saved for later propagation. The reference count of state 702 is decremented, and the New flag is set to false. FIG. 7B illustrates the state of the packets after page 40 and page 1 of replica packet 512 were dequeued.

Figure 7C:
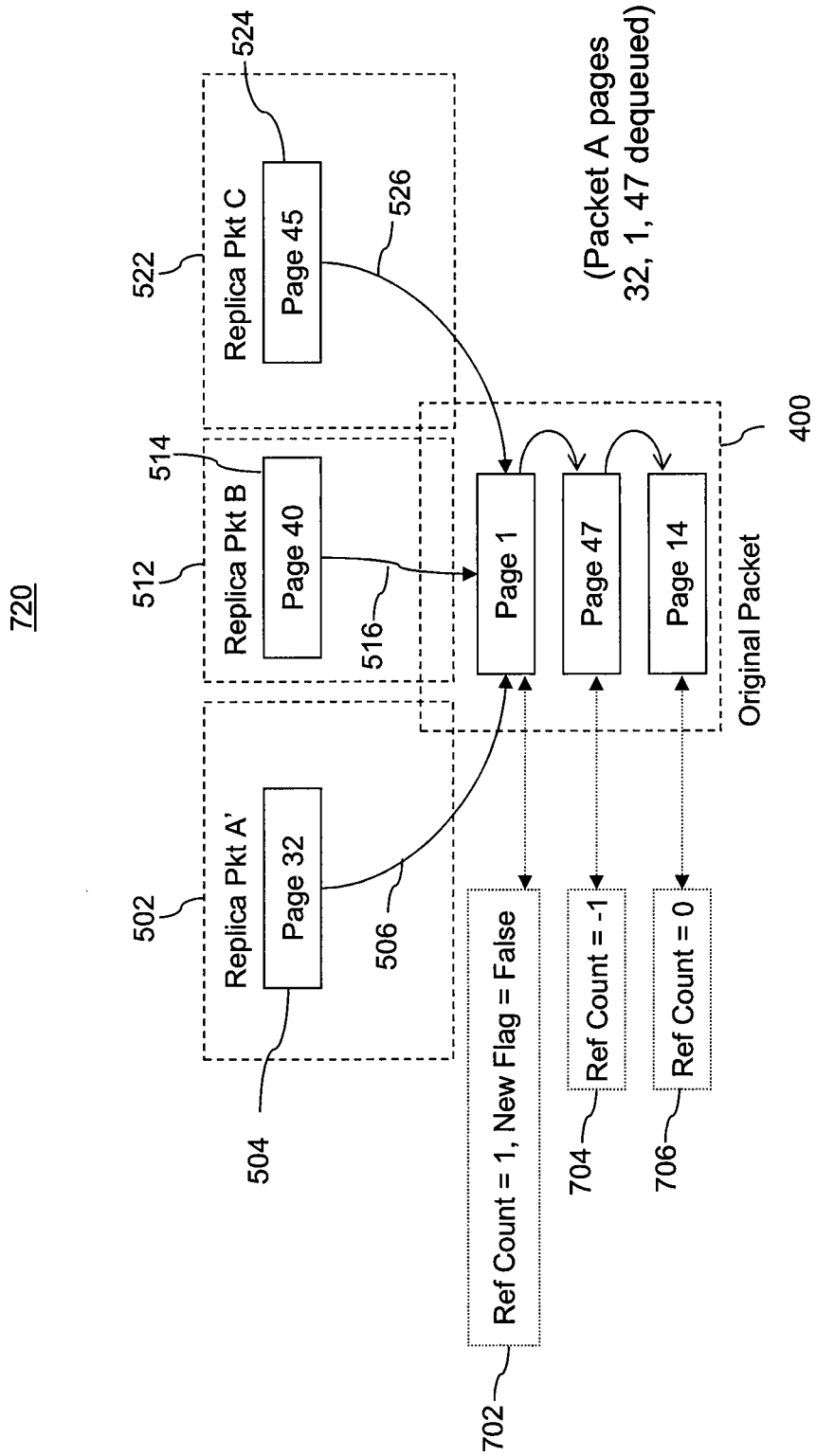

Next, pages 32, 1, and 47 of packet 502 are dequeued and the resulting state of the packets is illustrated in FIG. 7C. The New flag of state 702 of page 1 was already set to false, so the reference count of page 1 is inspected and decremented from 2 to 1. Reference count 704 of page 47 is also inspected and decremented. Since replica packet 512 has not dequeued page 47 yet, the reference count for this pages remains at the initial value of 0. When replica packet 502 dequeues page 47, the reference count is inspected and decremented from 0 to −1.

Figure 7D:
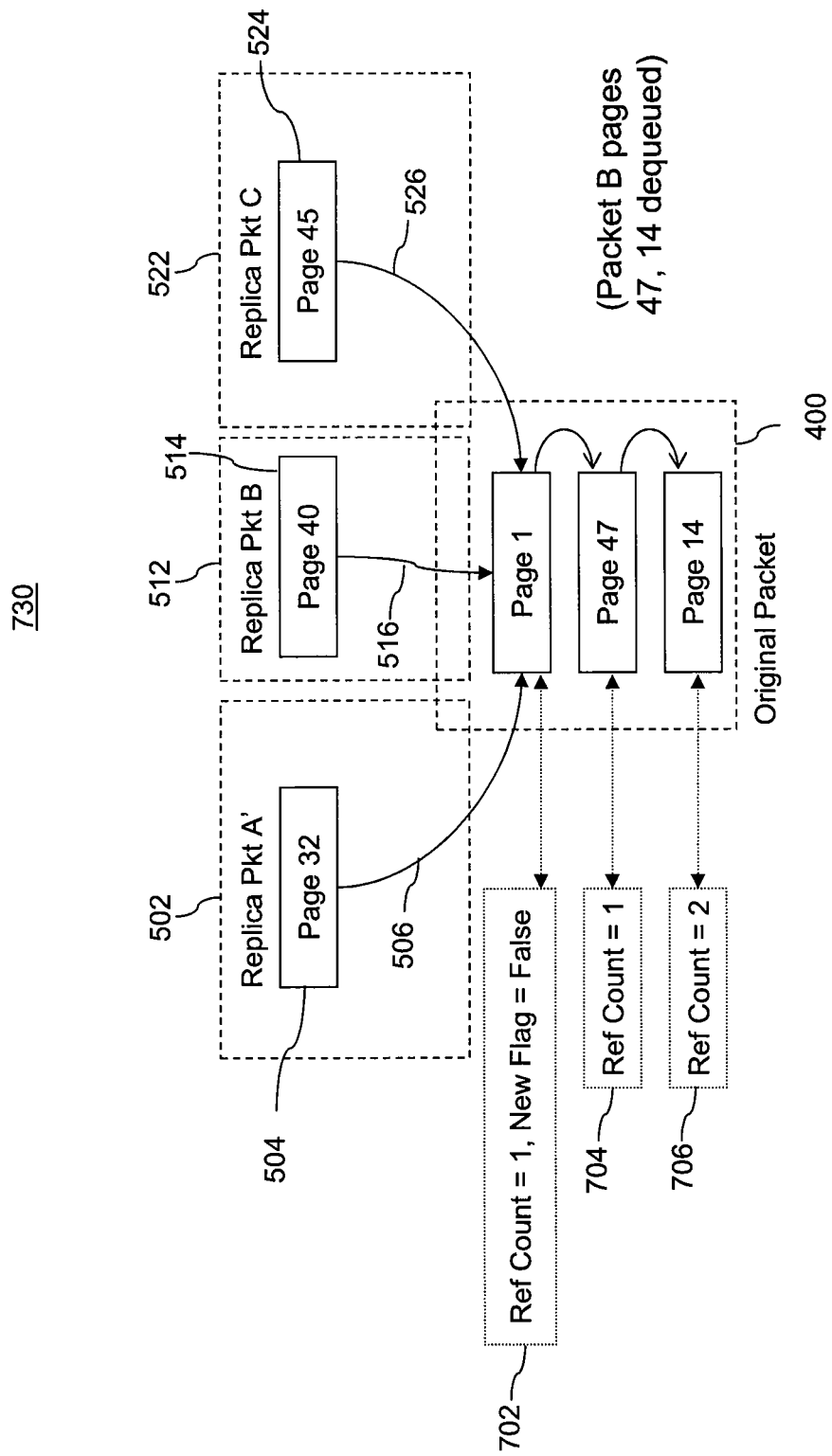

Next, pages 47 and 14 of replica packet 512 are dequeued and the resulting state of the packets is illustrated in FIG. 7D. Because replica packet 512 was the first replica packet to have a page dequeued, the saved reference count is propagated to each page as it is dequeued. Thus, reference count 704 of page 47 is increased by the saved reference count (e.g., 3) and then decremented, for a net change of +2. Similarly, reference count 706 of page 14 is increased by the saved reference count minus one. Replica packet 512 has now been completely dequeued, but no pages have been freed.

Figure 7E:
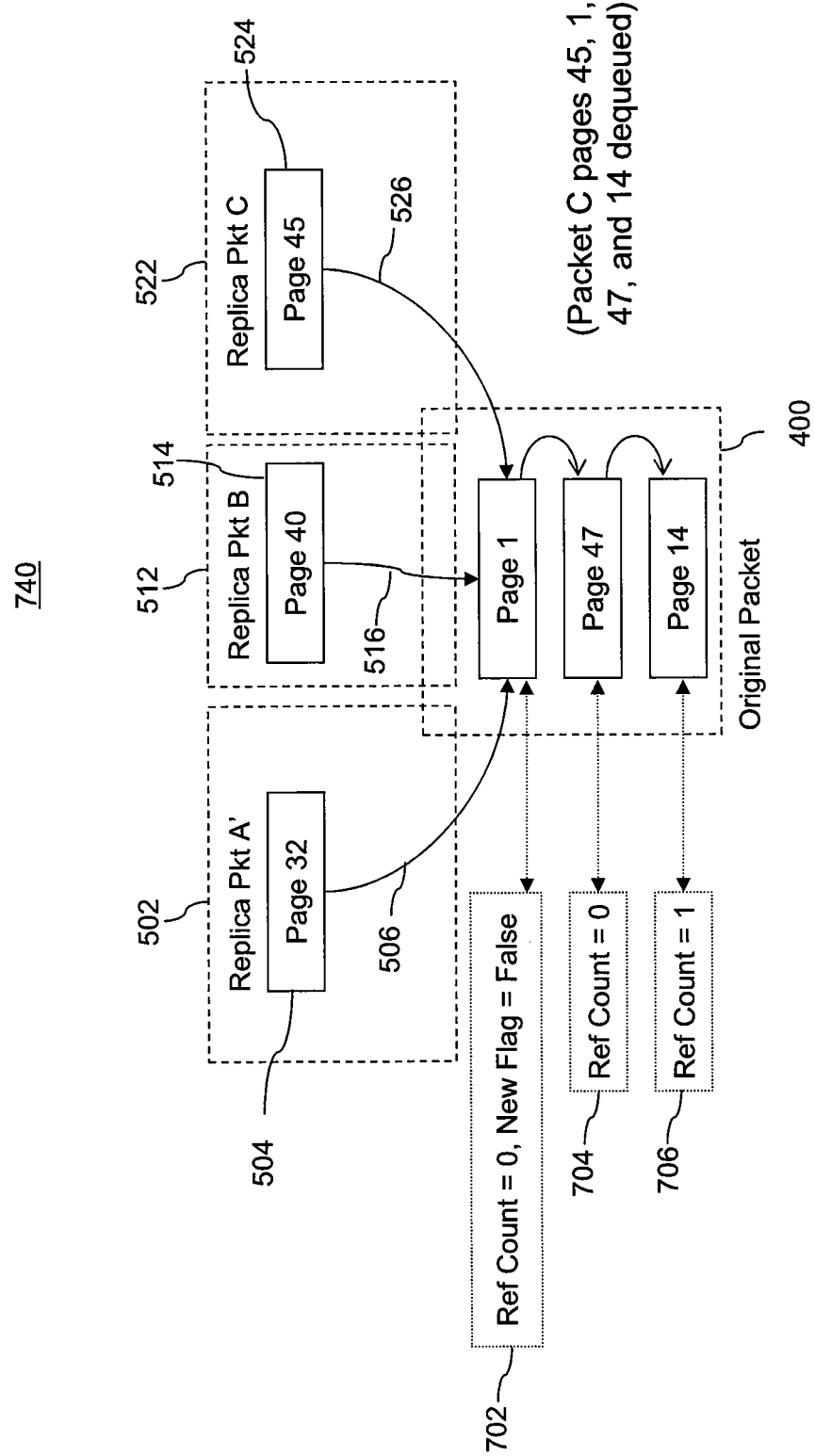

Next, replica packet 522 is completely dequeued (e.g., all of its pages are dequeued) and the resulting state of the packets is illustrated in FIG. 7E. As each page is dequeued, its respective reference count is inspected and decremented. Because reference count of state 702 of page 1 and reference count 704 of page 47 are both 1 before decrementing, those pages are freed. All reference counts are decremented.

Figure 7F:
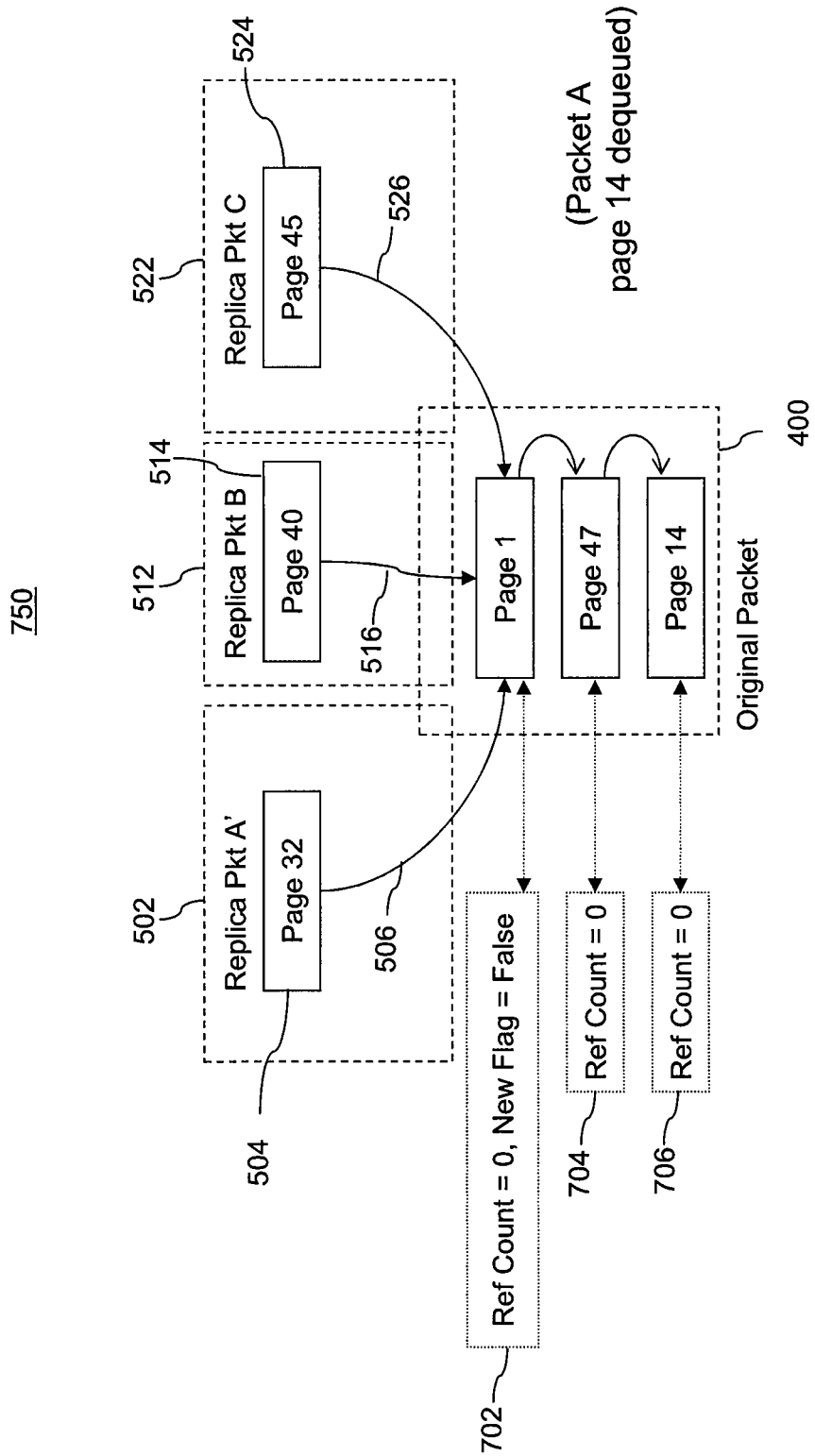

Next, the last remaining page, page 14 of packet 502, is dequeued and the resulting state of the packets is illustrated in FIG. 7F. Because reference count 706 of page 14 is 1 before decrementing, page 14 is freed. Reference count 706 is decremented.

Example Computer System

Various aspects of the present invention can be implemented by software, firmware, hardware, or a combination thereof. Calculations may be approximated using table lookups. Hardware implementations of individual components are not limited to digital implementations and may be analog electrical circuits. Additionally, embodiments may be realized in a centralized fashion in at least one communication system, or in a distributed fashion where different elements may be spread across several interconnected communication systems. Any kind of computer system or other apparatus adapted for carrying out the methods described herein may be suited.

Figure 8:
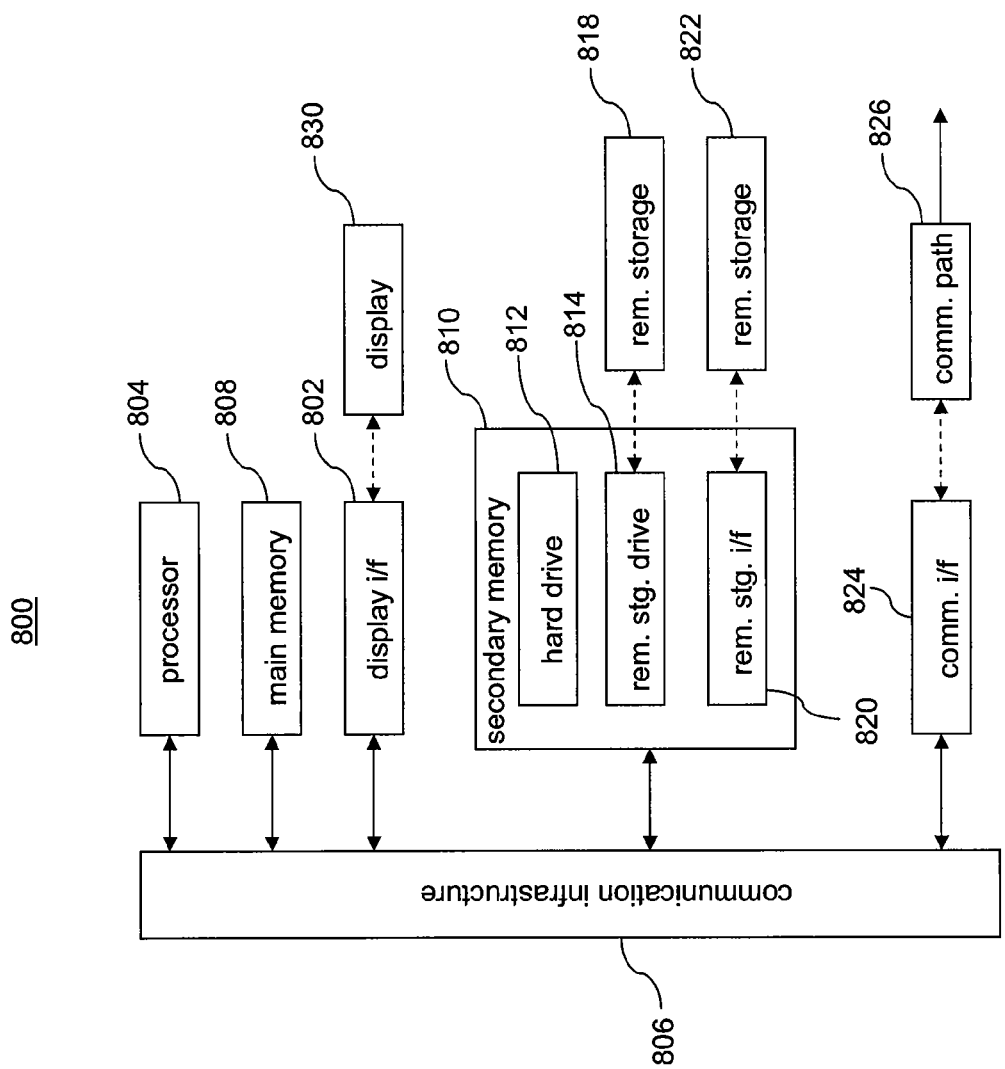
FIG. 8 shows an example computer system in which embodiments of the present invention may be implemented.

FIG. 8 illustrates an example computer system 800 in which the present invention, or portions thereof, can be implemented as computer-readable code. For example, the methods illustrated by the flow charts 600, 650, 670, and 680 shown in FIGS. 6A-6D can be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, any type of non-volatile memory, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard drive 812. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowcharts 600, 650, 670, and 680 of FIGS. 6A-6D discussed above. Accordingly, such computer programs represent controllers of the computer system 800. Where the invention is implemented using software, the software may be stored in a computer program product and loaded into computer system 800 using removable storage drive 814, interface 820, hard drive 812 or communications interface 824.

The invention is also directed to computer program products comprising software stored on any computer useable medium. Computer programs or software in the present context means any expression, in any language, code or notation, of a set of instructions intended to cause a system having an information processing capability to perform a particular function either directly or after either or both of the following: a) conversion to another language, code or notation; b) reproduction in a different material form. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

SUMMARY

The above described embodiments may be realized in hardware, software, or most commonly a combination thereof. Additionally, embodiments may be realized in a centralized fashion in at least one communication system, or in a distributed fashion where different elements may be spread across several interconnected communication systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

Alternatively, the above described embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
storing a packet as a linked list of at least one page;
replicating the packet, wherein the replicating comprises:
creating a plurality of new header pages, the new header pages being additional header pages that were not previously in the linked list and comprising duplicated data from a first page of the linked list,
linking each new header page of the plurality of new header pages to the first page of the linked list, the linking further comprising an offset to a location subsequent to the duplicated data,
setting a first page reference count to a value corresponding to a number of replica packets created, and
transmitting a plurality of replica packets corresponding to the number of replica packets created, wherein each replica packet comprises a corresponding one of the plurality of new header pages and a copy of the linked list; and
freeing the at least one page, wherein the freeing comprises:
tracking a number of references to the at least one page, and
after there are no more references to the at least one page, freeing memory used by the at least one page by propagating the first page reference count to remaining pages of the linked list and decrementing a reference count corresponding to the at least one page.

2. The method of claim 1, wherein transmitting the plurality of replica packets further comprises:
determining a location of the new header page of each replica packet; and
determining a location of the at least one page.

3. The method of claim 2, wherein determining the location of the new header page comprises:
dequeuing the new header page.

4. The method of claim 2, wherein determining the location of the at least one page comprises:
dequeuing the at least one page.

5. The method of claim 1, wherein transmitting the plurality of replica packets further comprises:
transmitting packet data.

6. The method of claim 5, wherein transmitting packet data comprises:
sending the packet data to a transmit client.

7. The method of claim 1, wherein freeing the at least one page permits the replica packets to be dequeued in any order.

8. The method of claim 1, wherein propagating the first page reference count comprises:
adding an initial first page reference count to the reference count.

9. The method of claim 1, further comprising:
duplicating at least some data from the at least one page in the new header page for each replica packet.

10. A non-transitory computer-readable medium having instructions stored thereon, that, in response to execution by one or more processors, cause the one or more processors to replicate an original packet, the instructions comprising:
instructions for enabling the one or more processors to store the original packet as a linked list of at least one page;
instructions for enabling the one or more processors to replicate the original packet, the instructions for enabling replication including:
instructions for creating a plurality of new header pages, the new header pages being additional header pages that were not previously in the linked list and comprising duplicated data from a first page of the linked list, wherein each new header page of the plurality of new header pages is linked to the first page of the linked list, the linking further comprising an offset to a location subsequent to the duplicated data,
instructions for setting a first page reference count to a value corresponding to a number of replica packets created, and
instructions for transmitting a plurality of replica packets corresponding to the number of replica packets created, wherein each replica packet comprises a corresponding one of the plurality of new header pages and a copy of the linked list; and
instructions for freeing the at least one page, the instructions for freeing including:
instructions for tracking a number of references to the at least one page, and
instructions for freeing memory used by the at least one page, after there are no more references to the at least one page, by propagating the first page reference count to remaining pages of the linked list and decrementing a reference count corresponding to the at least one page.

11. The non-transitory computer-readable medium of claim 10, the instructions for transmitting the plurality of replica packets further comprising:
instructions for determining a location of the new header page of the replica packet, and instructions for determining a location of the at least one page.

12. The non-transitory computer-readable medium of claim 11, wherein the instructions for determining the location of the new header page comprise:
instructions for dequeuing the new header page.

13. The non-transitory computer-readable medium of claim 11, wherein the instructions for determining the location of the at least one page comprise:
instructions for dequeuing the at least one page.

14. The non-transitory computer-readable medium of claim 10, wherein the instructions for transmitting the plurality of replica packets further comprise:
instructions for transmitting packet data.

15. The non-transitory computer-readable medium of claim 14, wherein the instructions for transmitting packet data comprise:
instructions for sending the packet data to a transmit client.

16. The non-transitory computer-readable medium of claim 10, wherein the instructions for propagating the first page reference count comprise:
instructions for adding an initial first page reference count to the reference count.

17. The non-transitory computer-readable medium of claim 10, further comprising:
duplicating at least some data from the at least one page in the new header page for each replica.

18. An apparatus, comprising:
- a header processor configured to determine a number of replica packets to be made and to generate a plurality of new header pages, each new header page corresponding to a replica packet;
- a packet receiver configured to store received data as an original linked list of at least one page, each new header page being an additional header page that was not previously in the original linked list and comprising duplicated data from a first page of the original linked list;
- a queue manager configured to link each new header page received from the header processor to the first page of the original linked list, the linking further comprising an offset to a location subsequent to the duplicated data, and to set a first page reference count to a value corresponding to a number of replica packets created; and
- a packet transmitter configured to transmit a plurality of replica packets corresponding to the number of replica packets created, wherein each replica packet comprises a corresponding one of the plurality of new header pages and a copy of the linked list,
- wherein the queue manager is further configured to track a number of references to the at least one page of the original linked list and, after there are no more references to the at least one page of the original linked list, to free memory used by the at least one page of the original linked list.

19. The apparatus of claim 18, wherein the packet transmitter is further configured to determine locations of the plurality of new header pages and to determine a location of the at least one page of the original linked list.

20. The apparatus of claim 19, wherein the packet transmitter is further configured to transmit packet data.

21. The apparatus of claim 18, wherein each new header page comprises at least some data duplicated from the at least one page.

* * * * *